United States Patent [19]

Totten et al.

[11] 4,291,857
[45] Sep. 29, 1981

[54] VEHICLE SEAT SUSPENSION

[75] Inventors: David S. Totten, Greendale; Thomas J. Worringer, Wauwatosa, both of Wis.

[73] Assignee: Allis-Chalmers Corporation, Milwaukee, Wis.

[21] Appl. No.: 92,673

[22] Filed: Nov. 9, 1979

[51] Int. Cl.³ ............................................ F16M 13/00
[52] U.S. Cl. .................................. 248/559; 248/562; 248/585
[58] Field of Search ............... 248/559, 571, 564, 565, 248/566, 567, 584, 585, 586, 591, 592, 593, 594, 562; 297/302, 307, 346, 308

[56] References Cited
U.S. PATENT DOCUMENTS

| 2,620,855 | 12/1952 | Stone | 248/584 X |
| 2,744,749 | 5/1956 | Fiedor | 248/559 X |
| 2,991,970 | 7/1961 | White | 248/565 |
| 3,322,379 | 5/1967 | Flannelly | 248/559 |
| 3,445,080 | 5/1969 | Flannelly | 248/564 |
| 3,552,694 | 1/1971 | Flannelly | 248/584 X |
| 3,756,552 | 9/1973 | Wilhelms | 248/565 |
| 3,814,370 | 6/1974 | Hurwitz | 248/564 |

Primary Examiner—J. Franklin Foss
Attorney, Agent, or Firm—Arthur L. Nelson

[57] ABSTRACT

A vehicle seat suspension for isolating vertical ride vibrations at low frequencies normally found in larger tractors or other vehicles, and to do this without penalty of large static deflection normally required to obtain similar isolation in the typical mass-spring damper isolation suspension system.

10 Claims, 4 Drawing Figures

VEHICLE SEAT SUSPENSION

This invention relates to a vehicle seat, such as a tractor seat, and more particularly to an adjustable vehicle seat suspension for accommodating various weights of operators and isolating the seat from the chassis and particularly for low frequencies normally transmitted from the chassis to the seat of large tractors or other vehicles.

Tractor ride and vibration data has indicated that a large amount of the vibration energy transmitted from the chassis to the seat under normal operating conditions is in the 2.5 Hertz range. The conventional mass-spring-damper seat suspension is practically limited to a lower resonant frequency of 2 Hertz and thus amplification of chasis motion can occur below the 3 Hertz range. Providing greater damping tends to reduce the amplification at the lower frequencies near the resonance, but also tends to reduce isolation effectiveness at the higher frequency. Accordingly, a seat suspension system using a counterweight, a spring and a lever is provided, which has a lower resonant frequency and will produce low transmissibility and isolation in the low frequency range of 1.75 Hertz and will provide good isolation of the seat across the high energy transmission 2.5 Hertz band to provide an improved ride. Energy in the low frequency band width of large tractors, normally transmitted to the seat, is isolated in the suspension system.

Accordingly, it is an object of this invention to provide low energy transmissibility at the 2.5 Hertz range on a vehicle tractor seat suspension.

In it is another object of this invention to provide low transmissibility at low frequencies in an adjustable tractor seat suspension system adapted to operate for operators from 100 to 300 pounds.

It is a further object of this invention to provide a tractor seat with low transmissibility from the chassis to the seat through the suspension system for low frequencies and also have heavily constant static deflection for operators ranging from 100 to 300 pounds.

The objects of this invention are accomplished by employing a suspension having a spring, damper, and a dynamic counterweight which produce an internal inertia couple. At antiresonant frequencies the inertia forces cancel out the spring forces to produce essentially zero transmissibility across the seat suspension system. The operation of the suspension system is independent of the weight of the seat or operator having built-in adjustment to compensate for variations in operator weights. The resonant frequency is very low and antiresonance is at a point immediately above the low resonance frequency. At the antiresonant frequency the transmissibility is very low.

Referring to the drawings.

Figure 1:
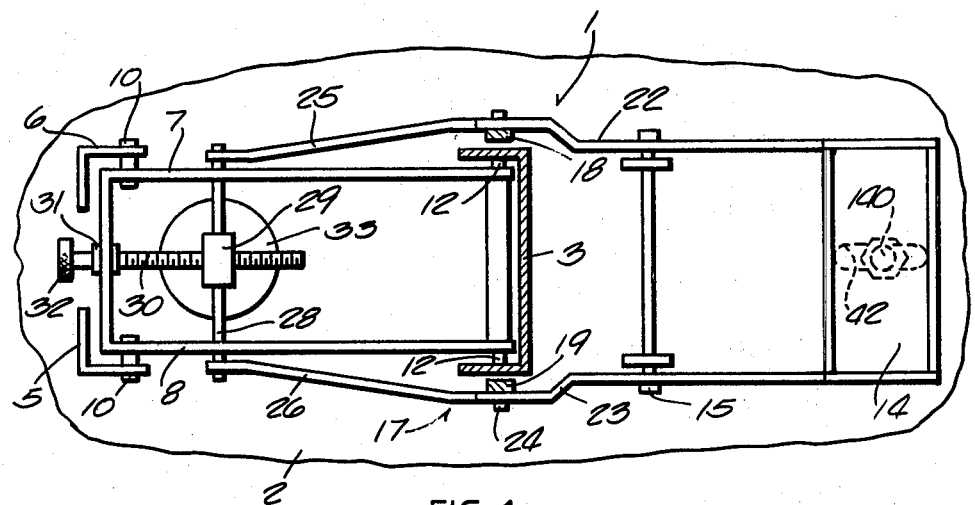
FIG. 1 illustrates a cross-section view taken on line I—I of FIG. 2.
Figure 2:
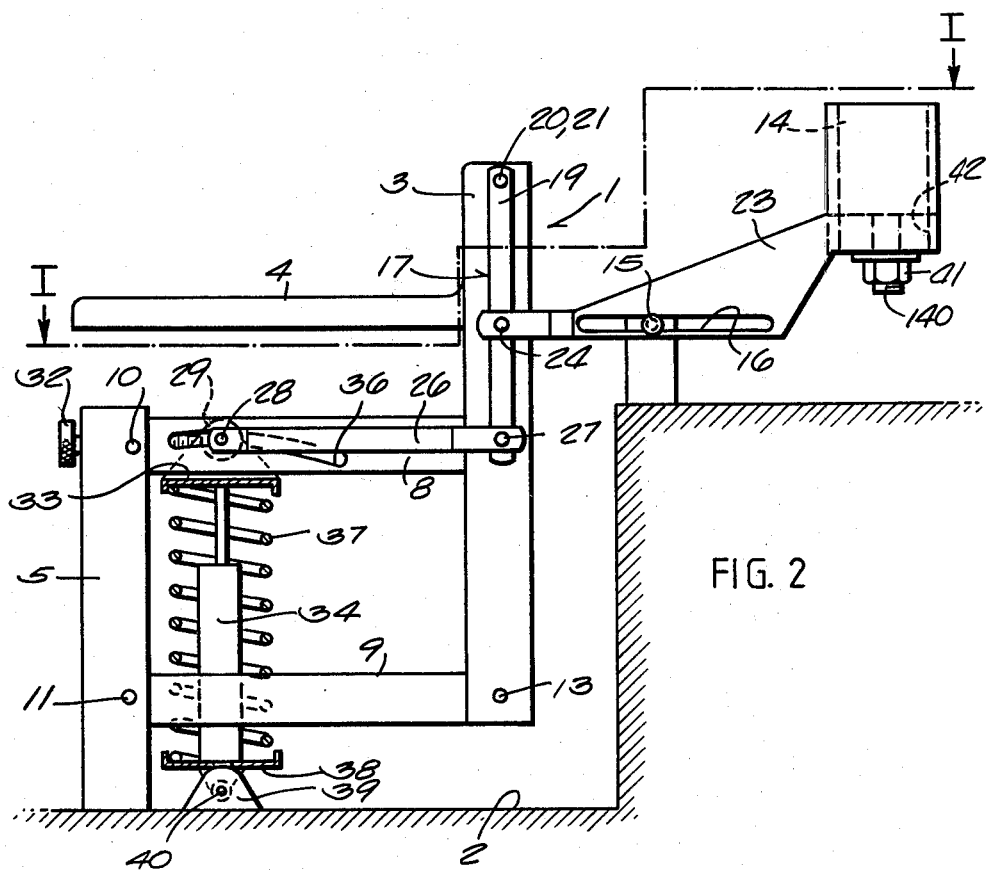
FIG. 2 is a side elevation view of the seat suspension for a tractor seat.

Referring to FIGS. 1 and 2, the seat suspension 1 is shown mounted on the vehicle chassis 2. The seat frame 3 carries the seat pad 4 intended for carrying a seat cushion. The uprights 5 and 6 are mounted on the vehicle chassis 2 and provide means for supporting the parallel linkage including the upper links 7 and 8 and the lower links of which 9 is shown. The upper links and lower links are pivotally connected on their front ends by the pins 10 and 11, respectively, where they are supported by the uprights 5 and 6. The lower links are pivotally connected at their rear ends to the frame 3 by pins 12 and 13 as shown. The linkage forms a parallelogram of which the seat frame 3 can be raised and lowered during operation. The counterweight 14 is pivotally supported on the rod 15 carried on the vehicle chassis 2. The rod 15 rides in the slot 16 to allow variation in the length of the pivot arm between the rod 15 and the upright arms 18 and 19 as well as the rod 15 and the weight 14. An adjusting mechanism 17 includes the upright arm 18 and 19 on each side of the frame 3. Each of the arms 18 and 19 are pivotally connected to the frame with a pin 20 and 21, respectively, to carry the adjusting linkage on the frame 3. The side arms 22 and 23 form slots of which slot 16 is shown which carry the counterweight 14. Side arms 22 and 23 are connected by pins 24 and 25 to the respective upright arms 18 and 19 of which pin 24 is shown connecting the upright arm 19 to the side arm 23.

The upright arms 18 and 19 extend downwardly and are pivotally connected to a pair of push rods 25 and 26. The push rods 25 and 26 are also pivotally connected to the upright arms 18 and 19 of which pin 27 is shown pivotally connecting the side arm 19 with the push rod 26. The push rods 25 and 26 extend forwardly to connect to the cross pin 28. The cross pin 28 pivotally connects the side arms 25 and 26 with the screw block 29 which has a threaded inner periphery receiving a mating threaded screw 30. The threaded screw 30 has a peripheral recess which receives the bushing 31 is mounted in cross member which is a part of upper link 7 and 8. Screw 30 and bushing 31, is provided with knurled head 32 for rotation in adjusting of the position of the adjusting linkage 17.

The screw block 29 carries the spring seat 33 and also provides a pivotal connection for the end of the shock absorber 34. As a screw block 29 is moved axially on the screw 30, cross pin 28 slides in the arcuate slot 36. This selectively positions the upper end of the spring 37 and the shock absorber 34 for greater or lesser mechanical advantage to accommodate operators weights.

As spring 37 extends downwardly to engage the lower spring seat 38, the shock absorber 34 extends downwardly to pivotally connect with a bracket 39 through the pin 40.

Normally, in adjustment of the screw 30, the adjusting mechanism 17 adjusts the position of the upper end of the spring 37 and shock absorber 34. Likewise the counterweight 14 is shifted fore and aft; changing the pivotal position of the pin 15 in the slot 16 to adjust the mechanical advantage of the counterweight 14 and the magnitude of force applied upwardly on the side arms 18 and 19.

It is noted that another method of achieving weight compensation is for the counterweight 14 to be provided with a bolt 140 which extends into the counterweight 14. As the nut 41 loosens, the counterweight 14 can be slid fore and aft in the slot 42 to adjustably position of the center gravity of the counterweight fore and aft and effectively changing the moment arm of the counterweight 14.

Figure 3:
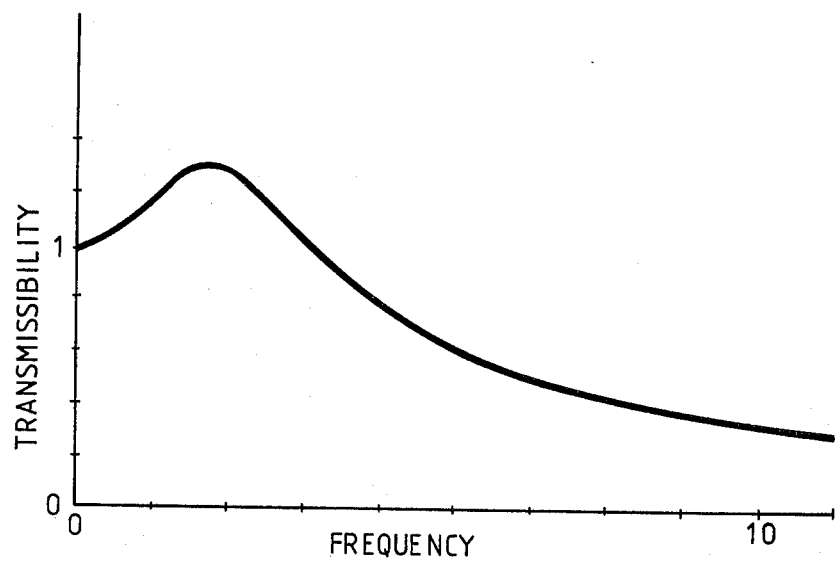
FIG. 3 is a graph showing transmissibility versus frequencies for a conventional mass spring and damper seat.

FIG. 3 illustrates the transmissibility at various frequencies through a conventional seat suspension system. It is noted that the energy at lower frequencies, particularly the frequencies around 2.5 Hertz, will normally be transmitted through the seat suspension system without attenuation.

Figure 4:
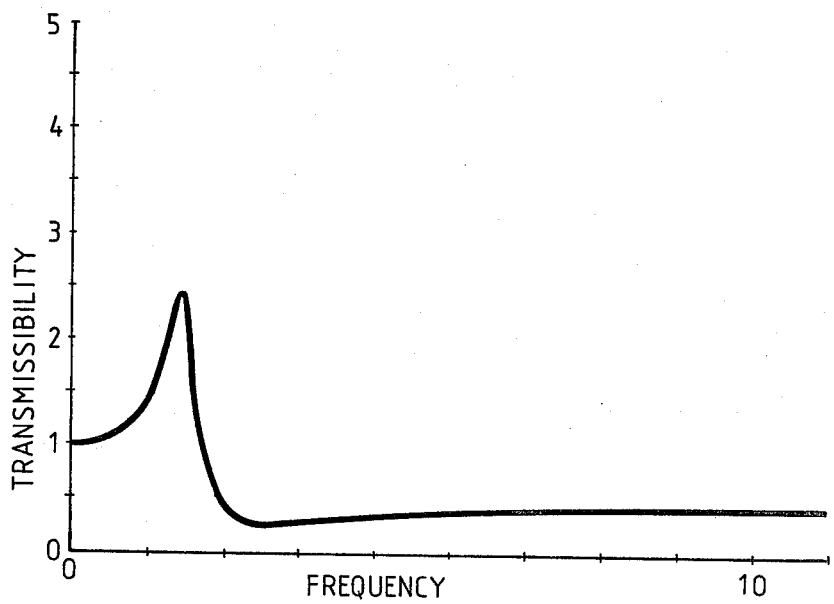
FIG. 4 is a graph showing transmissibility versus frequencies of the applicant's invention covering resonant and antiresonant frequencies.

FIG. 4 shows the transmissibility of the applicant's seat suspension for which the suspension parameters have been selected to provide the minimum transmissibility (antiresonance point) at the frequency where the dominant input energy occurs. It will be noted that the transmissibility is decreased substantially.

The operation of the seat suspension will be described in the following paragraphs.

The seat suspension 1 is carried on a parallel linkage supported on the uprights 5 and 6 carried on the vehicle chassis. Normally the seat is free to move up and down in response to the loading and the roughness of the terrain. This operation depends on the weight of the operator and also the spring rate of spring 37 and the damping rate of the shock absorber 34. To provide improved operation the counterweight 14 is applied to the rear of the seat frame which will partially counterbalance the operator's weight. The combination of the shock absorber, spring, and counterweight carry the load of the operator. Since the operator weight varies, an adjustment is provided by the knob 32. A dial may be provided for the knob 32 to indicate to the operator the approximate position of the screw adjustment for a given weight of operator. The screw block 29 is moved fore and aft as the adjusting screw is rotated. The cross pin 28 moves fore and aft in the slot 36 to provide the proper adjustment by positioning the shock absorber and spring to operate at a greater or lesser mechanical advantage relative to the operator's weight.

Simultaneously with operating the adjusting linkage 17, the counterweight 14 is also repositioned. With an increase in the weight of the operator, a shorter moment arm is provided between the pin 15 and pin 24 connecting the side arms 22 and 23 to the adjusting linkage 17. Accordingly, a greater force is produced upwardly to carry the greater weight of the operator when the adjustment is made. An optional separate adjustment is also provided on the counterweight. This is provided by the nut 41 and bolt 140. The counterweight 14 can be moved fore and aft to provide the desired or additional adjustment at this point.

When the adjusting mechanism 17 and the counterweight 14 are adjusted to the proper weight of the operator, the suspension system is in an adjusted position for operation. Normally the vibrations of the vehicle chassis 2 are transmitted through the suspension system to the seat. With the counterweight 14 and the spring 37 and shock absorber 34, a resonance is produced at a very low frequency. At this frequency, a substantial amount of transmissibility is permissible through the seat suspension system because of the lower level of chasis inputs, and lower operator sensitivity. At frequencies slightly above the resonant frequency the maximum resistance to transmission at the antiresonant point is reached. At this point, the seat suspension system essentially dissipates the energy while the operator is isolated from the movement of the vehicle chassis. This frequency is approximately at 2.5 Hertz and provides low transmissibility to isolate the operator from the vibrations of the vehicle chassis.

The embodiments of the invention in which an exclusive property or privilege is claimed are defined as follows:

1. A vehicle seat suspension system on a vehicle supporting a seat comprising, a vehicle chassis, a seat adapted for carrying an operator and movably mounted relative to said vehicle chassis permitting essentially vertical movement, resilient means and damping means connected between said seat and said vehicle chassis for resisting relative movement between said seat and said chassis from a neutral position, a lever having a weighted end pivotally connected to said seat and pivotally mounted on said vehicle chassis and extending generally transverse from the direction of movement of said seat producing inertia forces operating with forces of said resilient means and said damping means for absorbing vibrations with a minimum of transmissibility across the seat suspension at predetermined frequencies of vibration, a variable leverage means for varying the leverage of said weighted lever, a seat load adjusting means operating said variable leverage means and adjustably positioning said resilient means and said damping means to thereby compensate for varying seat loads.

2. A vehicle seat suspension system on a vehicle supporting a seat as set forth in claim 1, including means positioning said lever rearwardly of said seat.

3. A vehicle seat suspension system on a vehicle supporting a seat as set forth in claim 1 including a pivotal seat support on said vehicle chassis permitting pivotal movement of said seat.

4. A vehicle seat suspension system on a vehicle supporting a seat as set forth in claim 1 wherein said seat load adjusting means adjustably moving the upper end of said resilient means and said damper to compensate for varying weights of vehicle operator.

5. A vehicle seat suspension system on a vehicle supporting a seat as set forth in claim 1 wherein said resilient means includes a spring, a spring seat and a damper connection adjustably mounted on said seat and operated by said seat load adjusting means to maintain a constant static deflection of said seat for various weights of operators.

6. The vehicle seat suspension system on a vehicle supporting a seat as set forth in claim 1, wherein said damper includes a shock absorber pivotally connected between said chassis and said seat, said seat load adjusting means includes a slidable connection connecting one end of said shock absorber and said resilient means on said seat for slidably moving said connection on said seat to control the static deflection of said seat, said connecting means includes a mechanical adjusting linkage connected to said slidable connection including a link pivotally connected to said seat, an arm on said weighted lever pivotally connected to said link, said slidable connection thereby providing means to vary the slidable position of said resilient means and shock absorber while varying the mechanical advantage of said weighted lever and lifting force of said seat.

7. The vehicle seat suspension system on a vehicle supporting a seat as set forth in claim 1, an upright support means supported on said chassis, parallel linkage pivotally supported on said upright support means, said damper and said resilient means pivotally mounted on said vehicle chassis and pivotally connected to said vehicle seat, a slidable connection pivotally connected to said resilient means and said damper to slidably position the upper end of said spring and damper to vary the connection with said seat to control the static deflection responsive to the weight of the operator.

8. A vehicle seat suspension system on a vehicle supporting a seat as set forth in claim 1 wherein said lever defines a slot, a support slidably positioned in said slot for varying the leverage of said weighted lever to thereby vary the upward force carrying said seat.

9. A vehicle seat suspension system on a vehicle supporting a seat as set forth in claim 1 including two parallel vertical links, means supporting one of said links on said chassis, two parallel horizontal links pivotally connected to said vertical links, means connecting said damper and said resilient means to one of said horizontal links, said seat load adjusting means slidably positioning said resilient means and damper to vary the seat supporting force adjustably positioned under said seat to maintain the static seat deflection constant for any operator weight.

10. A vehicle seat suspension system on the vehicle supporting a seat as set forth in claim 1 a pivotal support for said seat, slidable means for said seat pivotally connected to said resilient means and said damper for selectively positioning the supporting force from said resilient means and damper fore and aft to vary the weight supporting force of said slidable means responsive to the weight of the operator.

* * * * *